J. W. SUTTON & M. MEADE.
FRICTION TRANSMISSION GEAR.
APPLICATION FILED DEC. 6, 1916.

1,225,371.

Patented May 8, 1917.
2 SHEETS—SHEET 1.

WITNESSES
Arthur K. Moore
W. W. Babcock

INVENTORS
John W. Sutton
Morrison Meade
BY Richard Owen
ATTORNEY

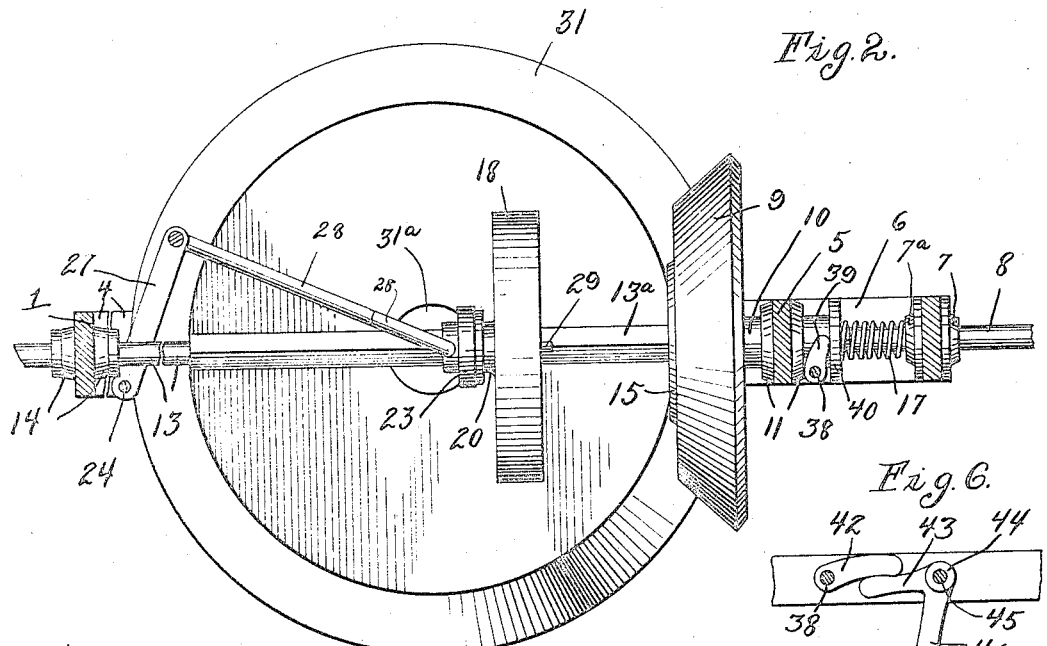
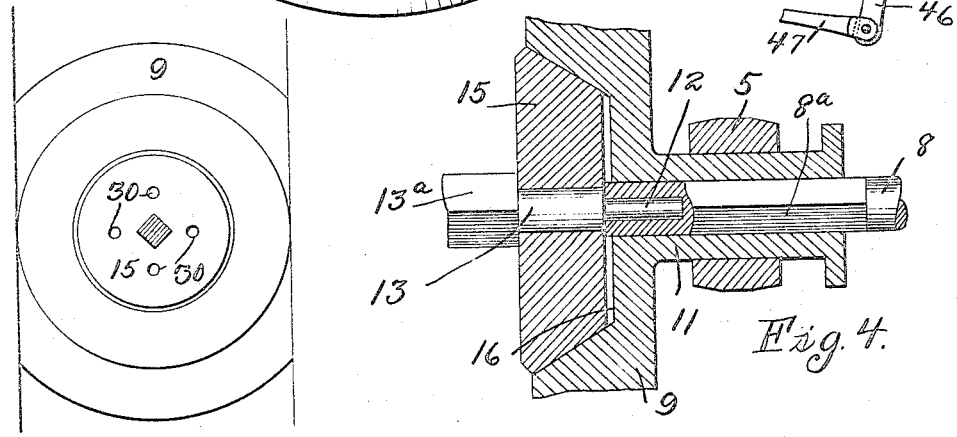
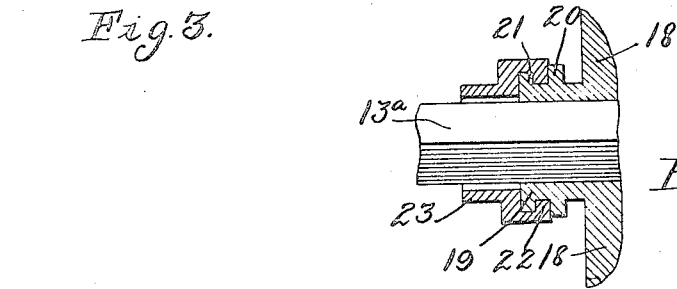

UNITED STATES PATENT OFFICE.

JOHN W. SUTTON, OF OAKHILL, AND MORRISON MEADE, OF LONGFORD, KANSAS.

FRICTION TRANSMISSION-GEAR.

1,225,371.

Specification of Letters Patent.

Patented May 8, 1917.

Application filed December 6, 1916. Serial No. 135,396.

*To all whom it may concern:*

Be it known that we, JOHN W. SUTTON and MORRISON MEADE, both citizens of the United States, residing at Oakhill and Longford, respectively, in the county of Clay and State of Kansas, have invented certain new and useful Improvements in Friction Transmission-Gears, of which the following is a specification.

This invention relates to friction transmission gears, and more particularly to a friction gearing specially adapted for use in connection with automobiles and similar vehicles.

One of the main objects of the invention is to provide a variable speed transmission of simple construction and operation which may be quickly and easily shifted to drive in either direction, or may be changed from an indirect to a direct drive. A further object is to produce a clutch for connecting the driving shaft directly to the transmission shaft which is at all times secured against axial movement and is normally carried by the drive gear so as not to interfere in any way with the rotation of the transmission disk, this clutch and the drive gear being so mounted as to avoid sudden starting of the gearing under a heavy load such as would tend to injure the gearing. Another object is to provide a friction drive transmission gearing composed of two spaced cone gears mounted in axial alinement and a drive-cone-gear positioned mid-way between the two driven gears, and means for normally forcing all of said gears toward each other so as to insure accurate engagement between the driving faces of the same, the drive gear being forced between the driven gears so as to exert a wedging effect on the same. A still further object is to provide means for moving the drive gear and the driven gear axially simultaneously so as to change from one drive to the other, such means being of very simple construction and accurate operation, and composed of very few parts. Further objects will appear from the detail description.

In the drawings:—

Fig. 2 is a section on line 2—2 of Fig. 1,

Fig. 3 is a detail view of the clutch-cone and drive gear,

Fig. 4 is a fragmentary detail sectional view of the mounting of the clutch-cone and drive gear, Fig. 5 is a fragmentary detail sectional view of the connections for shifting the transmission disk, Fig. 6 is a detail of the connections for moving the driven-cone-gears into inoperative position.

Figure 1:
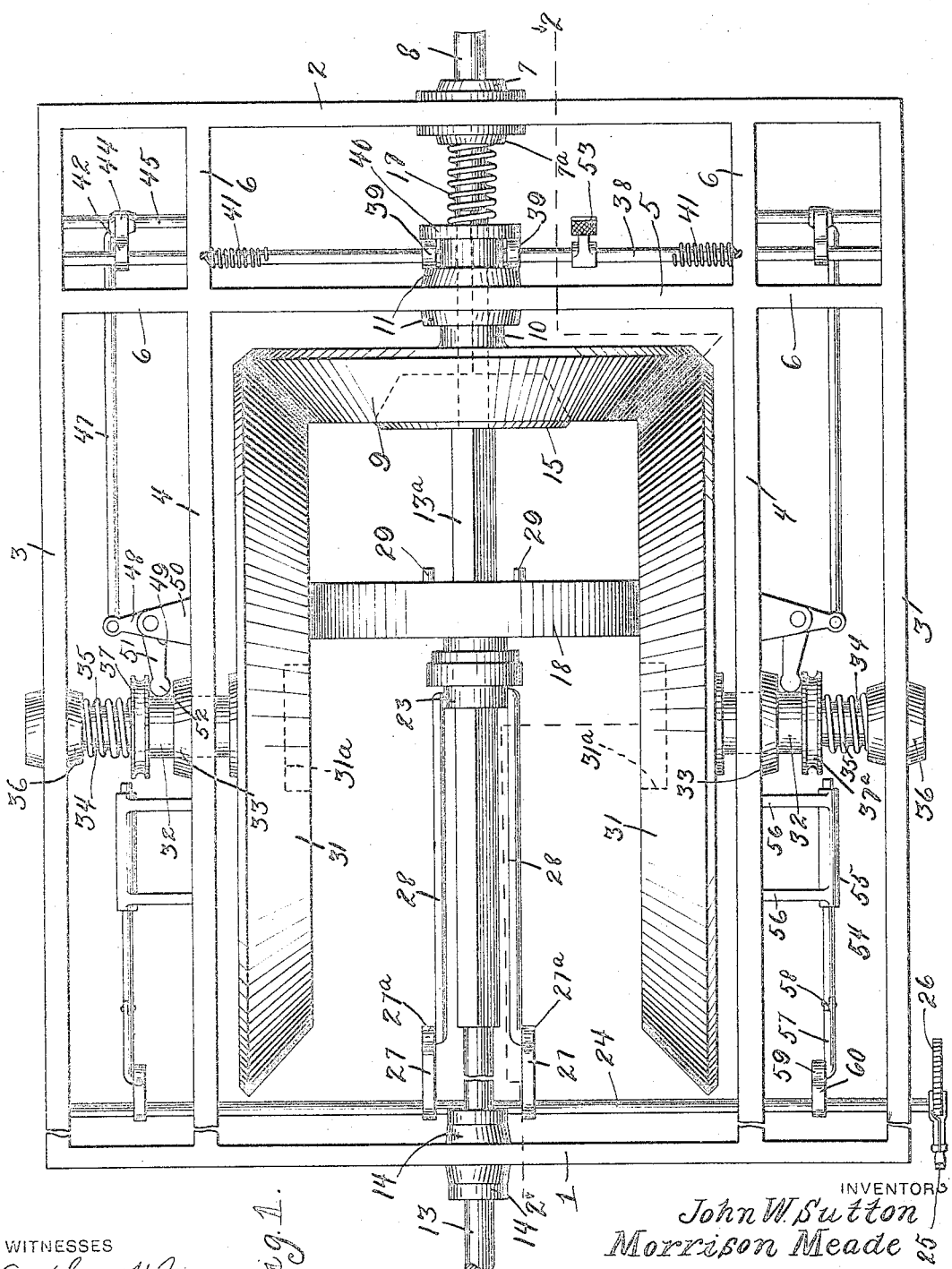
Figure 1 is a top plan view of a transmission gear embodying my invention.

The transmission gearing which I employ is supported by a frame A which may be secured to the frame of the automobile or other vehicle in any suitable manner. This frame is composed of the end bars 1 and 2, said bars 3, and the intermediate longitudinally extending reinforcing bars 4, the transversely extending reinforcing end bar 5, and the connecting bars 6 which secure the intermediate side and end bars to the side and end bars of the frame. At the transverse center of end bar 2 of the frame, on the outer face thereof, is secured a flanged bearing sleeve 7, a similar sleeve 7$^a$ being secured on the inner face of the bar. These sleeves rotatably support a drive shaft 8 which is adapted to be rotated by an engine in the usual manner. The inner end portion 8$^a$ of this drive shaft is of polygonal cross-section, as shown in Fig. 4 of the drawings. A drive-cone-gear 9 is mounted on drive shaft 8 at the inner end thereof. This gear is provided with an integral outwardly extending sleeve 10 rotatable in bearing plates 11 having an axial bore of polygonal cross-section which receives the polygonal portion 8$^a$ of the drive shaft, this portion of the shaft being somewhat longer than the sleeve so as to permit axial movement of the cone 9 in either direction on the drive shaft.

Drive shaft 8 is provided, at its inner end, with an axial bore which receives a stud 12 formed integral with, and extending axially from, a transmission shaft 13 which is rotatably supported in bearing sleeves 14 carried by the bar 1 of frame A. The stud 12 and bearing sleeves 14 coöperate to provide means for rotatably supporting the transmission shaft in the frame. The shaft 13 is provided, intermediate its ends, with an enlarged portion 13$^a$ of polygonal cross-section which extends to within a short distance of the inner face of gear 9. A cone-clutch member 15 is loosely mounted on the end of the transmission shaft 13 adjacent gear 9. This member is adapted to fit into a conical recess 16 provided at the center of gear 9, and is secured against axial movement by the enlarged portion 13ª of the transmission shaft and the inner end of the drive shaft, the cone being of such thickness as to fit snugly between these two members. An expansion spring 17 is mounted about the drive shaft and fits between the outer end of sleeve 11 of the drive cone and the bearing plate 7ª. This expansion spring acts to normally force the drive gear inward into tight frictional engagement with cone 15 so as to cause rotation of the cone but, as the cone is free to turn on the transmission shaft 13, the rotation of the drive shaft will not ordinarily be imparted directly to the transmission shaft.

A transmission disk 18 is slidably mounted on the enlarged polygonal portion 13ª of transmission shaft 13. This disk is provided with a central bore which corresponds in cross section to the cross section of portion 13ª of the transmission shaft so that, when the disk is rotated, this rotation will be imparted to the shaft. Disk 18 is provided with an outwardly directed neck 19 having, adjacent its outer end, the two spaced annular shoulders 20 and 21. These shoulders provide an annular groove which receives the inwardly directed flange 22 of a connecting head 23 slidable on portion 13ª of the transmission shaft 13. A shaft 24 is rockably mounted in frame A adjacent the end thereof remote from the drive shaft. This shaft may be rocked about its axis by a hand lever 25 secured on one end thereof provided with the usual detent which coöperates with a rack 26 for securing the shaft in rotary adjustment. At the approximate center of shaft 24, at each side of the transmission shaft and equi-distant therefrom, is an arm 27 the outer end of which is secured to shaft 24. Arm 27 is provided at its inner end with an eye 27ª through which is pivotally secured the outer end of a pull-rod 28 the inner end of which is pivotally secured to the operating head 23, the rods 28 being secured to the head at diametrically opposite points. Transmission disk 18 is provided on its inner face with a plurality of inwardly directed pins 29. These pins are adapted to fit into recesses 30 provided in the inner face of clutch-cone 15 when the disk 18 is in its innermost position. By rocking the shaft 24 so as to force the arms 27 inward and downward, disk 18 will be forced into a position closely adjacent the inner face of clutch-cone 15, thus forcing the pins 29 into recesses 30. When the transmission disk is in this position, the drive shaft 8 will be connected directly to the transmission shaft through drive cone 9, clutch cone 15, and transmission disk 18.

In using the direct drive just described, the cone 9 will first be moved out of engagement with clutch cone 15, the disk 18 being first connected to the cone 15, after which the drive cone is moved into engagement with the clutch cone, thus rendering it possible to connect the drive shaft directly to the transmission shaft axially without causing any sudden jerks or jars such as would injure the gear. As previously noted, the clutch cone 15 is normally free to turn upon the transmission shaft but is secured against axial movement in either direction. By this arrangement proper connection between the transmission disk and the clutch cone, and the clutch cone and the drive cone, is insured.

At each side of the transmission disk 13, and equi-distant therefrom, is mounted a transmission or driven cone 31. This cone is secured on the inner end of a sleeve 32 which is rotatably mounted through a bearing sleeve 33 carried by the frame bar 4 concentric with a supporting stub shaft 34 secured in frame bars 3 and 4. An expansion coil spring 35 is mounted about the stub shaft and is confined between a bearing ring 36 carried by frame bar 3 and a collar 37 formed at the outer end of sleeve 32 and integral therewith. The expansion spring 35 acts to force the cone gear 31 inward so as to hold the inner face thereof in tight frictional engagement with the circumference of disk 18. When in this position, the gears 31 are also held in tight frictional engagement with the drive gear 9, as shown in Fig. 1 of the drawings. In this position, the drive gear exerts a wedging effect on the two driven gears, which tend to force the drive gear outward axially, thus insuring accurate contact or mesh between the driving surface of these gears. For this purpose, the driven gears are arranged in axial alinement, the axes of these gears being positioned at right angles to the axis of the drive gear, as shown. With the gears connected in this manner, the rotation of the drive shaft 8 is imparted through gear 9 to the gears 31 and from these gears to the transmission shaft through the transmission disk 18. By shifting the transmission disk toward and away from the axis of the gears 31, the speed of rotation of the transmission shaft may be varied within wide limits. Also, by moving the transmission disk from one side of this axis to the other side, the direction of drive will be reversed. To permit this reversing of the drive, each gear 31 is provided with a recess 31ª at the center of its inner face. By this means, when the disk 18 is brought into such a position that its transverse center will be in alinement with the axis of the gears 31, all injury to the driving surface of the disk, such as would result if the inner surface of the gears were continuous, is avoided. Also, the gears are so relatively disposed that, as the transmission disk approaches the axis of the gears 31, the speed of the drive will be reduced so that, in shifting from one direction of drive to the other, this change will be made at low speed thus avoiding all sudden jerks such as would result in changing the direction of drive at high speed. A rock shaft 38 is mounted in frame A parallel with, and adjacent frame bar 5. At the approximate center of this shaft are secured two spaced arms 39. These arms extend upward and inside of the annular flange 40 provided at the outer end of sleeve 11 of drive disk 9. Coiled tension springs 41 are wound about this shaft and each has one end secured thereto, and the other end to the frame member 6. These springs act normally to rotate shaft 38 inward and downward so as to permit inward movement of the drive cone. Shaft 38 is further provided, adjacent each end, with an outwardly directed arm 42 secured thereon. This arm engages over the upper arm 43 of a bell crank 44 rockably mounted on a stub shaft 45 supported in the frame bar 3 and frame member 6. The lower arm 46 of the bell crank is pivotally secured at its lower end to a rod 47 the inner end of which is pivoted to the outer end of arm 48 of a bell crank 49 rockably mounted in a bracket 50 secured to the frame bar 4. The inner arm 51 of bell crank 49 is provided with an integral rounded head 52 which engages with the inner face of the collar 37 of sleeve 32. By this means, when the shaft 38 is rocked downward and outward, by means of a foot lever 53 secured thereto, the drive cone 9 will be forced outward out of engagement with the clutch-cone 15 and gears 31 against the action of expansion spring 17, and the cones 31 will be also moved outward axially by means of the rods 47 and bell cranks 49 against the action of springs 35. This renders it possible to completely disconnect all of the gears at a single operation so as to prevent rotation of the transmission shaft.

Special means are provided for locking the driven gears 31 in inoperative position. For this purpose the collar 37 of sleeve 32 is provided with a central annular groove 37ᵃ. When the driven cone has been moved into its outermost position the collar is in such position that groove 37ᵃ is in axial alinement with a locking rod 54 which is slidably mounted in a sleeve 55 supported in spaced relation to, and parallel with, the frame bar 4 by means of the supporting arms 56. The outer end of locking bar 54 is pivotally secured to the inner end of a connecting rod or link 57, as at 58. The outer end of link 57 is pivotally secured through an eye 59 formed integral with an arm 60 which is secured on rock shaft 24 adjacent the end thereof. When the gears 31 are moved outward in the manner described, they are maintained in this position by means of the foot lever 53 and the connections between the same and the bell cranks 49. With the collars 37 in position in alinement with the lock bars 54, the rock shaft 24 is rocked inward and downward by means of the hand lever 25. This movement of shaft 24 forces the lock bars 54 inward so that they extend into the annular grooves 37ᵃ of collars 37 thus locking the gears 31 against inward movement. Simultaneously with this movement of the lock bars 54, the transmission disk 18 is forced inward longitudinally of the transmission shaft so as to bring the pins 29 into engagement with recesses 30 of clutch cone 15. The clutch cone will rotate idly on the forward portion of transmission shaft 13, due to the rotation which has been imparted to it by the drive cone 9 during the indirect drive of the transmission, thus insuring proper engagement of the pins into the recesses. After the cone 15 has thus been connected to the transmission shaft 13 through disk 18, the pressure on foot lever 53 may be released so as to permit inward movement of the drive cone into engagement with the clutch cone, thus connecting the drive shaft directly to the transmission shaft so as to obtain a direct drive. It is to be noted that this inward movement of the drive cone will be caused by the resilient expansion spring 17, and is not a positive movement so that a certain amount of slippage between the drive cone and the clutch cone is permitted, thus permitting the transmission shaft to be gradually raised to the same speed of rotation as the drive shaft and avoiding all sudden jerks or jars such as would injure the transmission, and would result from a positive direct connection between the transmission and drive shafts. It is also to be noted that the movement of the drive cone into and out of operative position is controlled by the same means as controls the movement of the driven cone 31, this means being adapted to permit independent inward axial movement of the drive cone after the driven or transmission cones have been locked in their outermost inoperative position. Also, by this construction, when it is desired to use the indirect drive, the drive cone 9 may be first permitted to move inward, after which the cone 31 may be released from the locking rods 54. The cones 31 when so released move inward into tight frictional engagement with the driving face of the drive cone and have a tendency to force the drive cone outward axially so that the drive cone exerts a wedging effect between the two cones 31 thus insuring accurate driving contact between the driving faces of all of the cones.

In view of the fact that the indirect drive is imparted from the inner faces of the cones 31 to the peripheral surface of the transmission disk 18, it is essential that these driving surfaces should at all times be maintained in accurate contact. By having the clutch cone 15 separate from the transmission disk 18, this accuracy of the engagement between the driving surfaces is insured. If the clutch cone 15 were formed integral with, or carried by, transmission disk 18, this member would tend to seek its true axis of rotation, as the transmission shaft will be rotated at relatively high speed. This tendency of the clutch cone to seek its true axis of rotation would cause a certain amount of rocking of the transmission disk, which must necessarily have a certain amount of looseness about the transmission shaft so as to permit of its adjustment, and this rocking of the transmission disk would seriously interfere with the proper contact of the driving faces of the disk and the gears 31. We overcome this difficulty by mounting the clutch cone in the manner shown, independently of the transmission disk, and so related to this disk and the drive gear as to enable the transmission shaft to be quickly and easily connected directly to the drive shaft.

What we claim is:

1. In transmission gearing, the combination of a transmission shaft, a disk slidably mounted on said shaft and connected to the shaft for rotation therewith, an axially movable driven-cone-gear mounted at each side of the transmission shaft, said gears being in axial alinement and having their common axis disposed at righ angles to the axis of said shaft, means for forcing said gears toward said shaft so as to maintain the inner faces of the gears in driving engagement with said disk, a drive shaft mounted in axial alinement with said transmission shaft, a cone drive gear mounted thereon for axial movement and connected to said shaft so as to rotate therewith, means for holding said drive gear in mesh with said driven gears, means for simultaneously moving all of said gears outward axially into inoperative position, said means being adapted to permit return of the drive gear to its innermost position independently of said driven gears, and means for locking the driven gears in inoperative position and for simultaneously connecting the said disk directly to said drive gear so as to rotate therewith.

2. In transmission gearing, the combination of a drive shaft, a transmission shaft in axial alinement therewith, a cone driven gear mounted at each side of said transmission shaft in axial alinement, a disk slidably mounted on the transmission shaft and connected to said shaft for rotation therewith, means for normally forcing said gears inward so as to maintain the inner faces thereof in engagement with said disk, each of said gears being provided with a central recess in its inner face, a cone drive gear mounted on said drive shaft and connected to the shaft so as to rotate therewith, means for holding said drive gear in frictional engagement with both of said driven gears, and means for adjusting said drive disk longitudinally on the transmission shaft at either side of the common axis of the said driven gears.

3. In transmission gearing, the combination of a transmission shaft having an enlarged intermediate portion, a drive shaft in axial alinement therewith and closely adjacent one end of the transmission shaft, said enlarged intermediate portion being reduced to form a bearing stud, the said drive shaft being provided with an axial bore to rotatably receive said stud, a cone clutch member rotatably mounted on the transmission shaft intermediate said enlarged portion thereof and said stud, said cone being provided with a plurality of recesses in its inner face, a drive disk slidably mounted on the enlarged portion of the transmission shaft and connected thereto so as to rotate with said shaft, said disk being provided with a plurality of pins adapted to engage into the recesses of the clutch cone, an axially movable cone gear mounted at each side of the drive shaft, means for forcing said gears inward, a drive cone gear mounted on said drive shaft for axial movement and connected to the shaft so as to rotate therewith, said gear being provided with a conical recess to receive the said clutch cone, resilient means for forcing the said drive cone inward axially, means for simultaneously moving all of said gears outward into inoperative position, said means being adapted to permit inward movement of the drive gear independently of the driven gears, and means for locking the said driven gears in inoperative position and for simultaneously forcing the said disk toward the drive-cone-gear so as to cause engagement of the pins carried thereby into the recesses of the clutch cone.

4. In transmission gearing, the combination of a transmission shaft, axially movable driven cone-gears mounted at each side of the transmission shaft in axial alinement and equi-distant therefrom, a disk slidably mounted on the transmission shaft and connected thereto for rotation with said shaft, means for forcing the said driven gears inward into engagement with said disk, a drive shaft mounted in axial alinement with, and closely adjacent, said transmission shaft, an axially movable drive cone gear mounted on the drive shaft and connected thereto so as to rotate with said shaft, means for forcing said drive gear inward axially into engagement with said driven gears, means for moving all of said gears outward simultaneously, said means being adapted to permit independent inward movement of the said drive gear, and means for releasably securing the driven gears in inoperative position independently of the drive gear whereby inward movement of the driven gears into engagement with the drive gear subsequent to the inward movement of the drive gear may be obtained so as to insure accurate mesh of the said gears.

5. In transmission gearing, the combination of two axially alined driven cone-gears, a drive cone having its axis disposed at right angles to the common axis of the driven gears, all of said gears being mounted for axial movement in either direction, means for forcing each of said gears inward axially, and means for moving all of said gears outward axially simultaneously, said means being adapted to permit return of the said drive gear to its innermost position independently of the driven gears.

6. In transmission gearing, the combination of two axially alined driven cone-gears, a drive cone gear mounted to mesh with said driven gears and having its axis disposed at right angles to the common axis of the driven gears, a transmission shaft positioned between the driven gears, a transmission disk slidably mounted on the shaft and adapted to engage the inner faces of the driven gears when said gears are in their innermost positions, means for simultaneously moving all of said gears outward axially, said means being adapted to permit return of the drive gear to its innermost position independently of the driven gears, means for locking the driven gears in their outermost positions and for simultaneously moving the said disk into a position closely adjacent the drive gear, and means for frictionlly connecting the drive gear to the disk when the disk has been moved into its innermost position.

In testimony whereof we affix our signatures in presence of two witnesses.

JOHN W. SUTTON.
MORRISON MEADE.

Witnesses:
PETER HAMMERLE,
W. E. FORD.